(12) United States Patent
Collins et al.

(10) Patent No.: US 7,120,832 B2
(45) Date of Patent: Oct. 10, 2006

(54) STORAGE DEVICE PERFORMANCE MONITOR

(75) Inventors: Kevin Collins, Fort Collins, CO (US); Michael P. Fleischmann, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 658 days.

(21) Appl. No.: 09/966,953

(22) Filed: Sep. 27, 2001

(65) Prior Publication Data

US 2003/0061546 A1 Mar. 27, 2003

(51) Int. Cl.
G06F 11/00 (2006.01)

(52) U.S. Cl. .......................... 714/42; 714/718

(58) Field of Classification Search .............. 714/42, 714/47, 54, 5–6, 718, 769, 770; 711/204
See application file for complete search history.

(56) References Cited

U.S. PATENT DOCUMENTS

| | | | |
|---|---|---|---|
| 5,506,955 A | 4/1996 | Chen et al. | 395/183.02 |
| 5,566,317 A | 10/1996 | Treiber et al. | 395/444 |
| 5,684,945 A | 11/1997 | Chen et al. | 395/182.18 |
| 5,802,069 A * | 9/1998 | Coulson | 714/718 |
| 5,859,823 A * | 1/1999 | Yamamuro | 369/47.14 |
| 5,956,750 A * | 9/1999 | Yamamoto et al. | 711/167 |
| 6,101,619 A * | 8/2000 | Shin | 714/710 |
| 6,223,252 B1 * | 4/2001 | Bandera et al. | 711/114 |
| 6,249,887 B1 * | 6/2001 | Gray et al. | 714/47 |
| 6,289,484 B1 * | 9/2001 | Rothberg et al. | 714/769 |
| 6,327,106 B1 * | 12/2001 | Rothberg | 360/53 |
| 6,401,214 B1 * | 6/2002 | Li | 714/6 |
| 6,408,406 B1 * | 6/2002 | Parris | 714/41 |
| 6,412,089 B1 * | 6/2002 | Lenny et al. | 714/769 |
| 6,460,151 B1 * | 10/2002 | Warwick et al. | 714/718 |
| 6,571,354 B1 * | 5/2003 | Parks et al. | 714/7 |
| 2002/0184580 A1 * | 12/2002 | Archibald et al. | 714/719 |

OTHER PUBLICATIONS

"Making Sure Disk Performance Statistics are Collected", Microsoft Corporation, 2000, 2 pages.
"Monitoring Hard Disk Performance" i386, Dublin, Ireland, 2001, 2 pages.
"Using th Performance Monitor", Microsoft Corporation, 2000, 2 pages.
"Pre-Failure Alerting", Dell Computer Corporation, published to the Internet at least as early as Apr. 9, 2001, 1 page.
"Efficient, Real-Time Management of Storage Resources", U.S. Appl. No. 09/589,144, filed Jun. 7, 2000, Duggan, et al.
"Hard Disk Drives", IBM Corporation, published to the Internet at least as early as Sep. 17, 2001, 5 pages.
"S.M.A.R.T., Advanced Drive Diagnostics", Quantum Corporation, 1998, 13 pages. NOTE: This article was printed from a local cache directory and therefore, some figures are unavailable.
"Information Brief: Self-Monitoring, Analysis and Reporting Technology", IBM Group, 1998, 4 pages.
"Playing it Smart", Eric Ottem, Judy Plummer, Seagate Technology White Papers, Jun. 1995, 4 pages.
"Data Lifeguard Online Diagnostics S.M.A.R.T. Test", Western Digital Corporation, published to the Internet at least as early as Sep. 28, 2000, 2 pages.

* cited by examiner

Primary Examiner—Dieu-Minh Le

(57) ABSTRACT

An apparatus and method for monitoring performance of a storage device. Preferably, the apparatus is embodied in computer readable program code. The apparatus and method may intercept communications between a computer system and the storage device, wherein the communications are compared to a threshold value and/or a predicted failure of the storage device. The apparatus and method may also respond to a decline in the performance of the storage device based on the analyzed communications, and preferably prior to the predicted failure thereof.

26 Claims, 7 Drawing Sheets

STORAGE DEVICE PERFORMANCE MONITOR

FIELD OF THE INVENTION

The invention generally pertains to performance monitors for use with computer systems, and more specifically, to a method and apparatus for monitoring the performance of a storage device.

BACKGROUND OF THE INVENTION

Computer systems are typically provided with access to one or more storage devices. The storage devices may be attached directly to the computer system itself. For example, a personal computer (PC) such as a laptop or desktop computer may include one or more attached storage devices such as a hard disk drive, a compact disk (CD), magnetic storage, etc. Alternately, or in addition to, the computer system may have access to remote storage devices, such as over a network. For example, a workstation may have remote access to a network storage device such as a fibre channel Storage Area Network (SAN), a Network Attached Storage (NAS) device, etc. Or for example, a workstation may have remote access to a shared hard disk drive or other storage device attached to a server or other workstation that is available over a network.

The performance of a storage device, whether attached or remote, depends on a number of factors, such as the extent of use, type of use, etc. Over time and with use, the performance of the storage device may decline or even fail altogether. Declining performance and/or complete failure of a storage device may result in lost data, time and money, not to mention frustration for anyone needing access to the data stored thereon. In addition, when a storage device fails altogether, the data on the failed device may be irretrievable.

One solution for optimizing the performance of a storage device is to defragment it. During a defragmenting operation, similar files and file segments may be grouped together on the storage device so that these files and file segments may be more readily accessed. However, defragmenting operations often take time to perform, and may be interrupted if the storage device is accessed during the defragmenting operation. In addition, defragmenting operations typically group all similar or like files with one another, without first assessing the need to do. As such, a time consuming defragmenting operation may not improve the performance of the storage device.

When a storage device fails altogether, data recovery may include an attempt to recover the data from the failed storage device itself. In some situations, the data may be recovered. However, such recovery may take considerable time before the data can be retrieved from the failed storage device and rewritten to another storage device. The data remains inaccessible during the recovery operation. In addition, this solution may be costly depending on the type of storage media and the extent of the failure. In some circumstances, the data may not even be recoverable.

Another, more common solution for data recovery, is to back-up data from one storage device to another storage device prior to a device failure. However, the user does not know when a storage device will fail, and hence the user does not know when to perform the back-up operation. Device failures often start out as what are called "recoverable" failures. That is, when an attempt to access data on the storage device fails, the storage device itself may retry or make another attempt to access the data thereon. Alternately, the storage device may report the failed attempt to the operating system, which may retry or make another call to the storage device to access the data thereon. In any event, when a retry is successful, nothing is reported to the user. As such, any potential problems with the storage device are "masked" to the user, and the user does not know of a potential failure of the storage device until it actually occurs.

Typically, the user must back-up data on the storage device to another storage device on a regular basis. However, even when data is backed-up on a regular basis, the user still does not know when the storage device will fail. As such, some data may still be lost when the storage device fails. That is, the data added or changed after the last back-up may not be recoverable when the storage device fails. Although more frequent back-ups may reduce the amount of lost data when the storage device fails, back-up operations take time to perform, and may slow other functions of the computer system while being performed. In addition, there may still be some data that is changed and/or added after the last back-up, and thus that data may be lost when the storage device fails.

SUMMARY OF THE INVENTION

The inventors have devised an apparatus for monitoring performance of a storage device. The apparatus is preferably embodied in computer readable program code that is stored on computer readable storage media. The apparatus may comprise program code for intercepting communications between the storage device and a computer system; program code for analyzing the intercepted communications, wherein the intercepted communications are compared to a predicted failure of the storage device; and program code for responding to a decline in the performance of the storage device prior to the predicted failure thereof. The program code for intercepting the communications may comprise program code for intercepting an error reported by the storage device, program code for measuring access time for the storage device, and/or program code for determining system overhead and program code for correcting the access time for the system overhead. The program code for responding may comprise, for example, program code for backing-up data from the storage device, and/or reallocating data on another sector of the storage device. As another example, the program code for responding to the decline in the performance of the storage device may comprise defragmenting at least a portion of the storage device.

A method for monitoring performance of a storage device is also disclosed. The method may comprise intercepting communications between the storage device and a computer system; analyzing the intercepted communications relative to a threshold value for the performance of the storage device; and responding to a decline in the performance of the storage device based on the analyzed communications. Intercepting the communications may comprise measuring access time for the storage device, correcting the measured access time for system overhead, and/or intercepting a failure report from the storage device. Responding to the declining performance of the storage device may comprise, for example, automatically backing-up data stored on the storage device, reallocating data to other sectors on the storage device, replacing the storage device, reporting the performance (e.g., to an administrator), defragmenting the storage device, etc.

Accordingly, the storage device may be defragmented and/or the files and file segments are reallocated thereon after a determination that such action is necessary to improve the performance of the storage device. In addition, the apparatus and method may determine how best to defragment and/or reallocate the storage device to optimize the performance thereof. Furthermore, the apparatus and method may monitor the performance of the storage device so that a response may be initiated prior to an actual failure of the storage device. For example, the data stored thereon may be moved prior to a failure, eliminating the need for expensive and time-consuming recovery operations.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
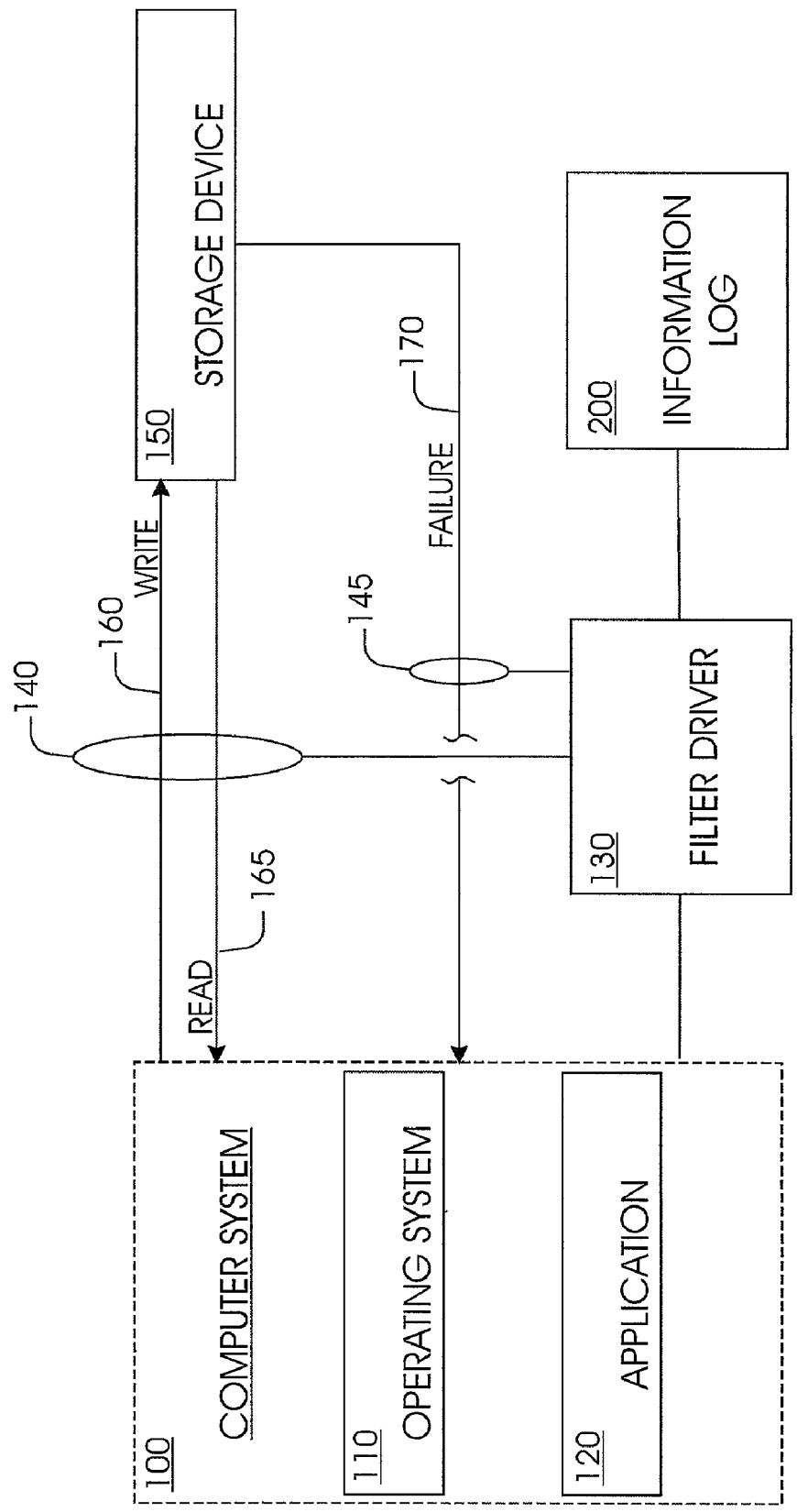
FIG. 1 is a high level diagram of a computer system and a storage device, illustrating an embodiment of the apparatus for monitoring the performance of the storage device.

FIG. 1 is a high level diagram illustrating an embodiment of the apparatus for monitoring the performance of a storage device 150. For purposes of illustration, the computer system 100 is shown comprising at least an operating system 110 and may further comprise applications 120 executed by the computer system 100. Although the storage device 150 is shown separately from the computer system 100, these components may be housed in a single unit. Also shown in FIG. 1 is a filter driver 130 for intercepting 140 communications (e.g., write commands 160, read commands 165) between the computer system 100 (e.g., the operating system 110, an application 120) and the storage device 150. In addition, the filter driver 130 may also intercept 145 errors or failures 170 reported by the storage device 150 to the computer system 100. The information from the intercepted communications between the computer system 100 and the storage device 150, and other information related thereto, as explained below, may be stored in an information log 200 for analysis thereof, according to the teachings of the invention.

The apparatus is preferably embodied in firmware and/or software (i.e., computer readable program code), stored in computer readable storage media and executed, for example, by the computer system 100. The computer readable program code may comprise: program code for intercepting communications between the computer system 100 and the storage device 150; program code for analyzing the intercepted communications, wherein the intercepted communications are compared to a predicted failure of the storage device 150; and program code for responding to a decline in the performance of the storage device 150 prior to the predicted failure thereof.

The program code for intercepting the communications may comprise, or operate in conjunction with, the filter driver 130. Communications that may be intercepted between the computer system 100 and the storage device 150 typically include "open", "close", "read", "write", "file creation", "error", etc. Mechanisms that allow applications to intercept such calls may be provided for use with operating systems, such as, Unix and Microsoft WINDOWS® operating systems. For example, see co-owned U.S. patent application Ser. No. 09/589,144 for "Efficient, Real-Time Management of Storage Resources", filed Jun. 7, 2000, of Duggan, et al., hereby incorporated by reference for all that it discloses.

It is understood that the computer system 100 may comprise any conventional computer, such as a desktop personal computer (PC), laptop PC, network workstation, network server, etc. In addition, the computer system 100 may comprise hardware and software that is not shown in FIG. 1. It is also understood that the firmware and/or software may comprise more than one routine and/or subroutine, and may be embodied in separate components. In addition, the program code may be a stand-alone application, or may be a plug-in module for an existing application and/or operating system. Alternatively, the program code may be integrated into an application or operating system. In yet another embodiment, the program code can reside at one or more network devices (not shown), such as an administrator terminal, a server, etc.

For purposes of illustration, FIG. 1 shows a single storage device 150. It is understood however, that the apparatus and method may be used with one or more storage devices 150, or that a single storage device 150 may comprise one or more storage media (e.g., an array of disks). It is further understood that although the storage device 150 is preferably a hard disk drive, it can be any suitable fixed or removable computer readable storage medium. For example, the storage device 150 may be, but is not limited to, a hard disk drive, zip disk, compact disc (CD), magnetic tape, etc. In addition, the storage device 150 may be any suitable network storage device including, but not limited to, storage attached to a personal computer (PC) or server, etc. It is further understood that the nature of the storage device 150 is immaterial to the teachings of the invention. That is, the storage devices 110–113 may be shared, password protected, etc.

Figure 2:
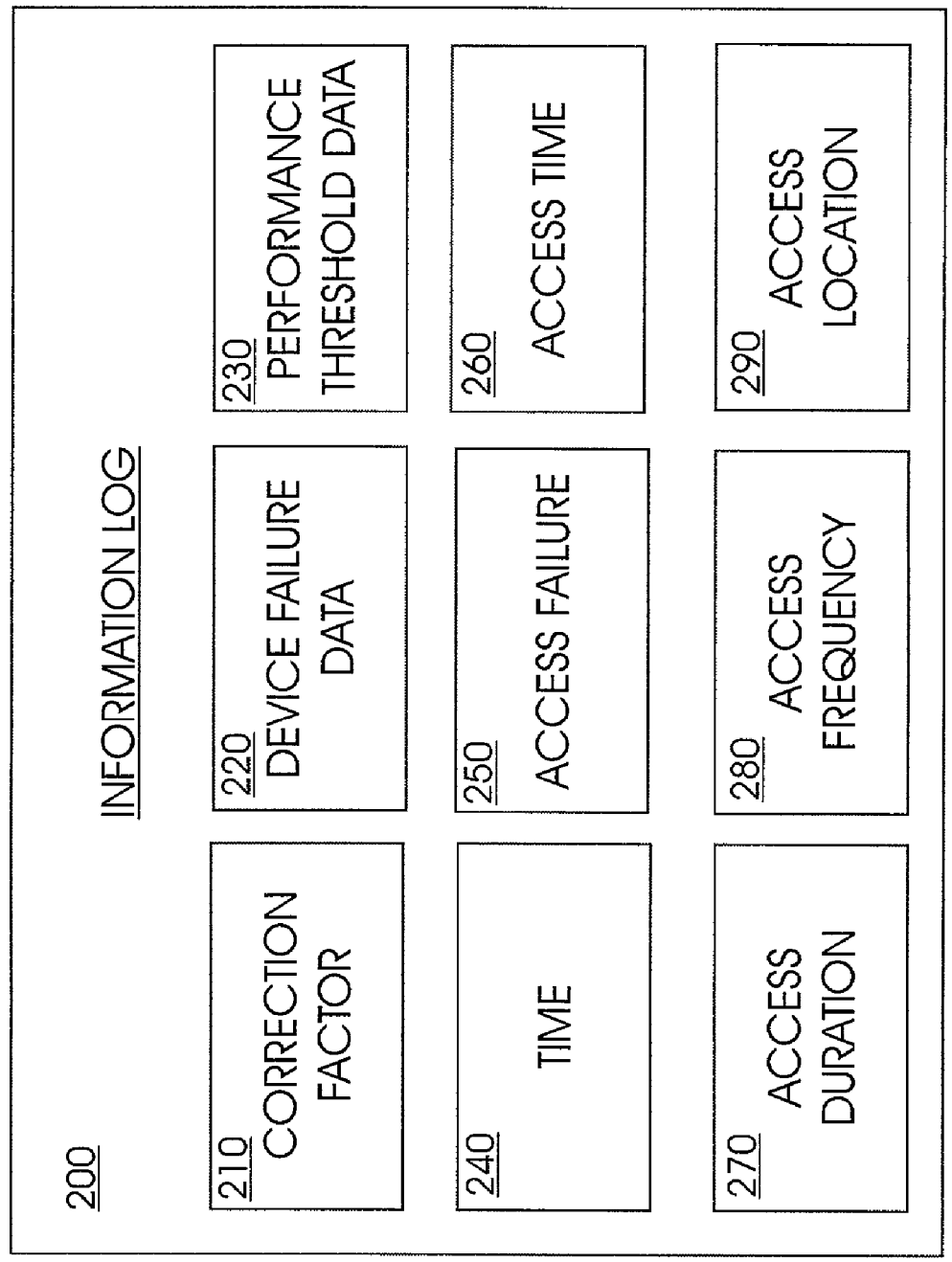
FIG. 2 illustrates an information log for monitoring the performance of the storage device.

FIG. 2 illustrates an information log 200 for monitoring the performance of the storage device 150. The information log 200 may be one or more suitable databases, data arrays, ASCII files, etc., for storing information (e.g., 240–290) that is intercepted from the communications between the computer system 100 and the storage device 150. Additional fields may also be provided, for example, for a correction factor 210 (e.g., for correcting the access time for overhead), device failure data 220 (e.g., for determining a threshold for responding to a decline in performance), and performance threshold data 230 (e.g., for responding to a decline in the performance of the storage device 150, prior to failure thereof). Preferably, the information log 200 may comprise intercepted information such as time 240 (e.g., a specific time or a period of time), reported access failures 250 (e.g., at time 240), and determined access times 260 (e.g., also at time 240), for monitoring the performance of the storage device 150 and responding to a decline in performance thereof prior to a failure of the storage device 150, as discussed below. The information log 200 preferably also may comprise intercepted information such as access duration 270, access frequency 280, and access location 290, for monitoring the performance of the storage device 150 and responding to a decline in performance thereof by defragmenting all or a portion of the storage device 150, as discussed below.

According to one embodiment of the apparatus and method, the storage device 150 is monitored for "hidden" or "masked" signs of declining performance. That is, when a recoverable failure occurs during an attempt to access the storage device 150, the storage device 150 may report an initial failure to the calling system or the operating system, which then retries the access command (e.g., an input/output (I/O) command) one or more times. When one of the retries is successful, nothing is reported to the user, thus masking a potential or pending problem with the storage device 150.

According to the teachings of the invention, such a recoverable failure may be identified based on an analysis of the failures reported from the storage device to the computer system 100. That is, the filter driver 130 may intercept reported errors or failures 170. In addition, the filter driver 130 and/or other suitable program code may also intercept other communications, such as, the location of attempted access on the storage device 150, amount of data, type of access, duration of access, etc. The information from the intercepted communications may be written to a storage database (e.g., information log 200). Suitable program code may also be provided for analyzing the intercepted communications. For example, the program code for analyzing the intercepted communications may find an increasing number of failures for the storage device 150 and/or a particular area thereof. When the number of failures exceeds a threshold, program code for responding to the decline in performance of the storage device 150 may warn the user of a potential or pending problem with the storage device 150.

Figure 3:
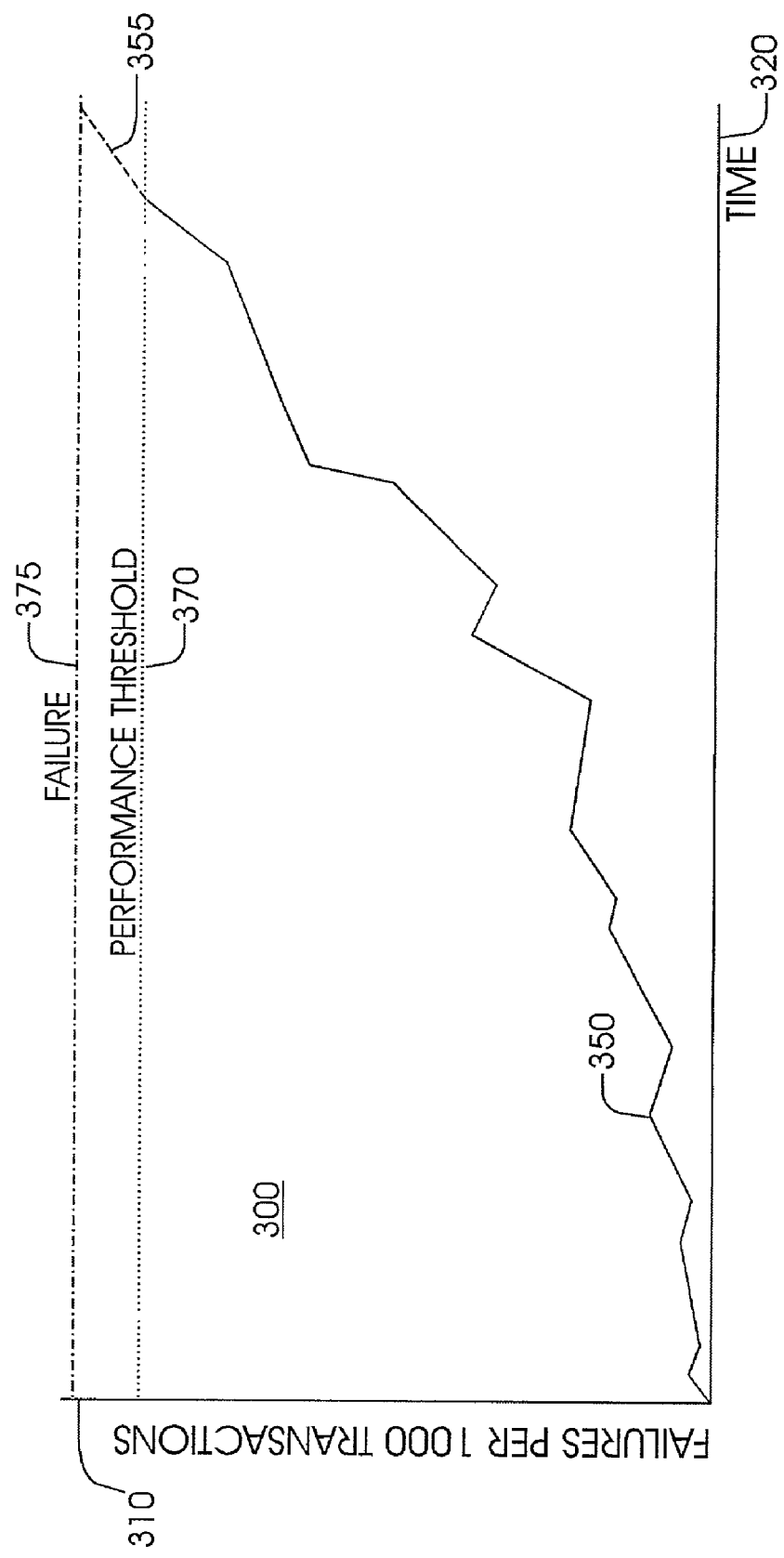
FIG. 3 shows exemplary information intercepted for analysis according to an embodiment of the apparatus.

FIG. 3 shows exemplary information intercepted from the communications between the computer system 100 and the storage device 150, for analysis according to the embodiment of the apparatus and method where a failure is reported from the storage device 150. This embodiment is further illustrated by the data presented in Table 1.

TABLE 1

| Time | Failures Per 1000 Transactions |
| --- | --- |
| T1 | 0 |
| T2 | 3 |
| T3 | 1 |
| ... | ... |
| T100 | 77 |

In this example, the number of failures per thousand transactions is intercepted and logged over time. For purposes of illustration, the data is shown by plot 300 in FIG. 3, wherein the number of failures per thousand transactions is plotted along the y-axis 310 as a function of time, shown along the x-axis 320. The logged information 350 indicates that during early operations of the storage device 150, there are very few failures reported by the storage device 150 to the computer system 100. For example, at times T1, T2, and T3 (see Table 1, above), there are very few failures reported. However, with use and over time, the logged communications 350 indicates that the storage device 150 begins to report more access failures. For example, at time T100 (see Table 1, above), there are seventy-seven failures reported for every one-thousand transactions that occur.

According to the invention, the intercepted communications may be compared to a known or predicted failure 375 of the storage device 150. That is, based on past performance of comparable storage devices, it may be known that the storage device 150 may fail entirely when the storage device 150 experiences a number of recoverable failures (e.g., approximately 100 failures for every one-thousand transactions). Alternately, or in addition to, the failure 375 may be derived or predicted to fail entirely when the storage device 150 experiences a number of recoverable failures (e.g., approximately 100 failures for every one-thousand transactions), based on statistical analysis of the logged information (e.g., curve fit 355).

A performance threshold 370 may be determined based on the known or predicted failure 375. Thus, when the analysis of the intercepted communications indicate that the performance of the storage device 150 is approximately at the performance threshold 370, a response may be initiated to prevent loss of the data on the storage device 150. For example, a performance threshold 375 may be "seventy-five failures per thousand transactions", based on the predicted failure 375 of "one-hundred failures per thousand transactions". Thus, for example, when the intercepted communications indicate that the performance of the storage device 150 is approximately seventy-five failures per thousand transactions (e.g., seventy-seven reported failures at time T100 in Table 1, above), a response may comprise alerting the user that the storage device 150 is about to fail so that the user may replace it, automatically backing-up or reallocating data on the storage device 150 to an alternate storage device, etc. As such, a response may be initiated prior to failure of the storage device 150 to prevent, or reduce the risk of, losing the data on the storage device 150 due to a failure thereof.

It is understood that the data shown in FIG. 3 and the data shown in Table 1 is merely illustrative of information that may be intercepted from communications between the computer system 100 and the storage device 150, and analyzed according to the teachings of the invention. The examples given above with respect to FIG. 3 and Table 1 are not intended to limit the scope of the intercepted communications to the values of this information or the type of information that may be intercepted and analyzed according to the invention. In addition, these examples are not intended to limit the teachings of the invention in any other manner. Furthermore, the information of FIG. 3 and Table 1 is not to be construed as actual data, and was not measured as such.

According to another embodiment, the storage device 150 is monitored for "hidden" or "masked" signs of declining performance. That is, when a recoverable failure occurs during an attempt to access the storage device 150, the storage device 150 may retry the access command (e.g., an input/output (I/O) command) itself. When the retry is successful, nothing is reported back up the calling chain (i.e., to the computer system 100), thus masking a potential or pending problem with the storage device 150. Because the recoverable error or failure is not reported by the storage device 150, however, the error or failure is not directly viewable by the filter driver 130.

According to the teachings of the invention, such a recoverable failure may be inferred by analyzing a history of access times to various parts of the storage device 150. That is, when the storage device 150 retries the access command (e.g., up to 10 times), a timer may be incremented until the access is successful. In addition, the filter driver 130 and/or other suitable program code may also intercept other communications, such as, the location of attempted access on the storage device, amount of data, type of access, duration of access, etc. The intercepted information may be written to a storage database (e.g., information log 200). Suitable program code may also be provided for analyzing the intercepted communications. For example, the program code for analyzing the intercepted communications may find lengthening execution or access times for the storage device 150 and/or a portion thereof. When the access time exceeds a threshold, program code for responding to the decline in performance of the storage device 150 may warn the user of a potential or pending problem with the storage device 150.

Figure 4:
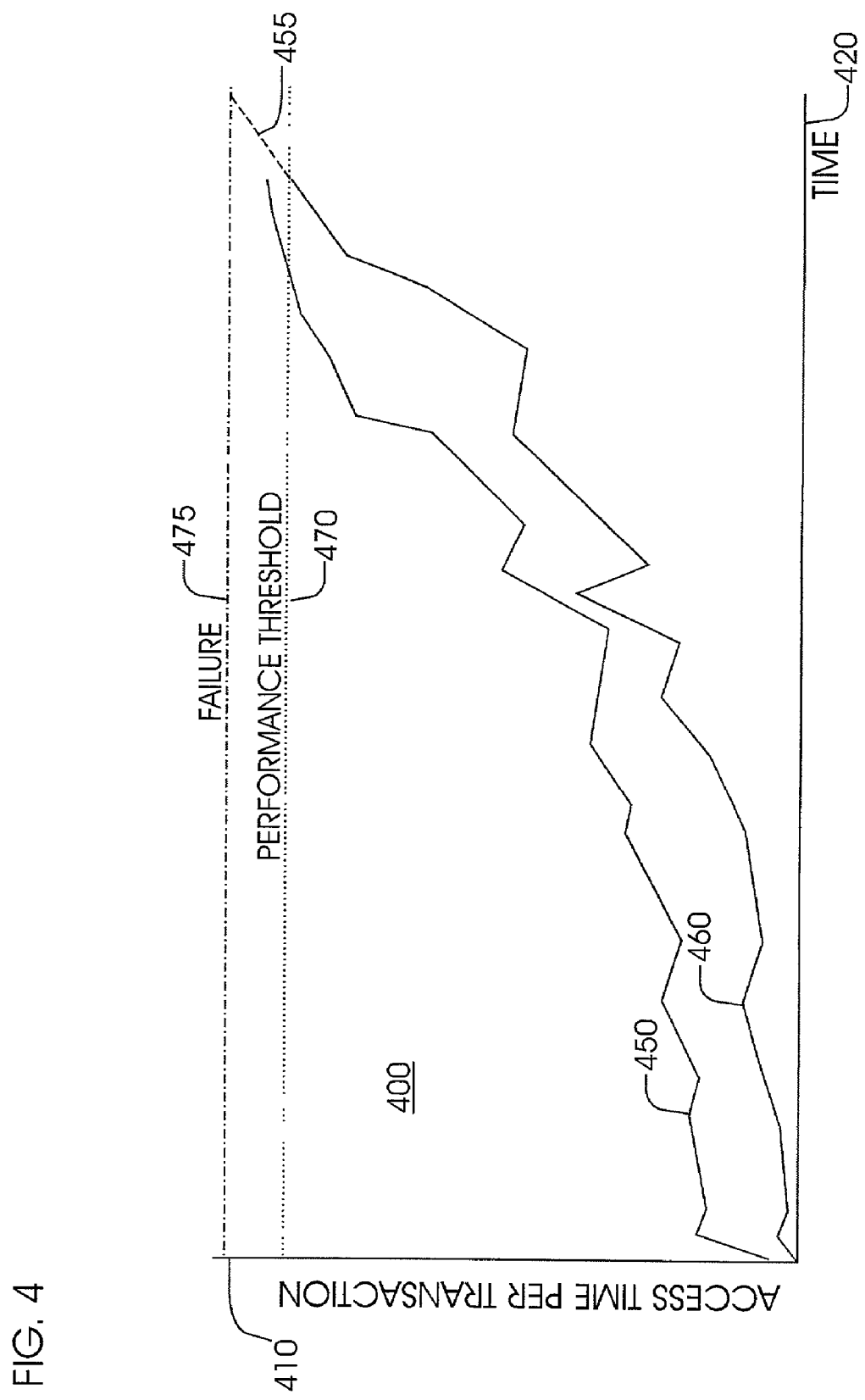
FIG. 4 shows exemplary information intercepted for analysis according to another embodiment of the apparatus.

FIG. 4 shows exemplary information intercepted between the computer system 100 and the storage device 150, for analysis according to the embodiment where an error or failure is not reported from the storage device 150. This embodiment is further illustrated by the data presented in Table 2.

TABLE 2

| Time | Measured Access Time (ms) | Corrected Access Time (ms) |
|---|---|---|
| T1 | 0.3 | 0.1 |
| T2 | 0.3 | 0.2 |
| T3 | 0.4 | 0.3 |
| ... | ... | ... |
| T100 | 2.8 | 2.6 |

In this example, the access time for the storage device 150 is intercepted and logged over time. For purposes of illustration, the data is shown by plot 400 in FIG. 4, wherein the access time is plotted along the y-axis 410 as a function of time, shown along the x-axis 420. The logged data may comprise measured access time 450 and/or corrected access time 460. The exemplary logged data indicates that during early operations of the storage device 150, the access time for the storage device 150 is relatively fast. For example, at times T1, T2, and T3 (see Table 2, above), the access time is less than 0.5 ms. However, with use and over time, the data 450 indicates that the storage device 150 begins to slow. For example, at time T100 (see Table 2, above), the average access time exceeds 2.5 ms, even once it has been corrected.

The access time for the storage device 150 may be influenced by a number of external factors, in addition to internal retries. For example, more than one call may be made simultaneously to the storage device 150, the load on the computer system 100 may impact the communications with the storage device 150, etc. Or for example, the overhead may be generated by, but not limited to, the CPU, the I/O overhead lock, IRQ lock, device I/O queue management, network load (e.g., for network accessed drives). These, and/or other external factors may influence the access time of the storage device 150 at various times, and indeed, need not influence the access time at all during other times.

Therefore, the apparatus preferably comprises program code for correcting the measured access time for these external factors. For example, the filter driver 130 may also monitor other calls to the storage device 150, and based on the number of simultaneous calls thereto, apply a correction factor to determine the access time of the storage device 150. Or for example, the operating system 110 may report the load on the computer system 100, and based on the load, a correction factor may be applied to determine the access time of the storage device 150. Or for example, the access time may be measured as a result of the filter driver itself sifting at a higher level and priority in processing. It may then determine when the storage device 150 is being accessed for a file versus when it is busy with an overhead function. These are merely exemplary of solutions for correcting the measured access time therefor, and other solutions thereto are also contemplated as being within the scope of the invention.

According to the invention, the intercepted communications may be compared to a known or predicted failure 475 of the storage device 150. That is, based on past performance of comparable storage devices, it may be known that the storage device 150 may fail entirely when the access time for the storage device 150 slows to a known or expected value (e.g., 3.0 ms). Alternately, or in addition to, the failure 475 may be derived or predicted to fail entirely when the storage device 150 slows to a known or expected value (e.g., 3.0 ms), based on statistical analysis of the intercepted communications (e.g., curve fit 455). Thus, a performance threshold 470 may be determined based on the known or predicted failure 475. Accordingly, when the intercepted communications indicate that the performance of the storage device 150 is approximately the performance threshold 370, a response may be initiated to prevent loss of the data on the storage device 150. For example, a performance threshold 475 may be an access time of 2.5 ms, based on the predicted failure of an access time of 3.0 ms. Thus, for example, when the intercepted communications indicate that the performance of the storage device 150 has an access time of approximately 2.5 ms (e.g., 2.6 ms at time T100 in Table 2, above), a response may be initiated. A response may comprise alerting the user that the storage device 150 is about to fail so that the user may replace the device, automatically backing-up or reallocating data on the storage device 150 to an alternate storage device, etc. As such, a response may be initiated prior to failure of the storage device to prevent, or reduce the risk of, losing the data on the storage device 150 due to a failure thereof.

It is understood that the data shown in FIG. 4 and the intercepted information shown in Table 2 is merely illustrative of communications that may be intercepted and analyzed. The examples given above with respect to FIG. 4 and Table 2 are not intended to limit the communications to the values thereof, or to the type of communications that may be intercepted and analyzed. In addition, these examples are not intended to limit the teachings of the invention in any other manner. Furthermore, the data of FIG. 4 and Table 2 is not to be construed as actual information, and was not measured as such.

Another embodiment may comprise defragmenting at least a part of the storage device 150 in response to the declining performance thereof. A storage device may become fragmented with use. However, when the fragmentation occurs only with respect to some of the data thereon, it may be inefficient to defragment the entire storage device 150. In addition, when the fragmentation occurs only with respect to data that is rarely accessed, it may be inefficient to defragment the storage device 150 at all. Therefore, the invention contemplates efficiently defragmenting the storage device 150. For example, directories may be reallocated to sectors that are closer to the files each represents. Or for example, directories may be grouped on the storage device 150 in the middle of the device to increase the access speed thereof. Or as another example, the most frequently used files may be reallocated to sectors in or near the center of the storage device 150 to increase the access speed thereof. These, and other examples of efficiently defragmenting the storage device 150 are contemplated under the teachings of the invention and are discussed in more detail below with respect to FIG. 5 and FIG. 6.

Figure 5:
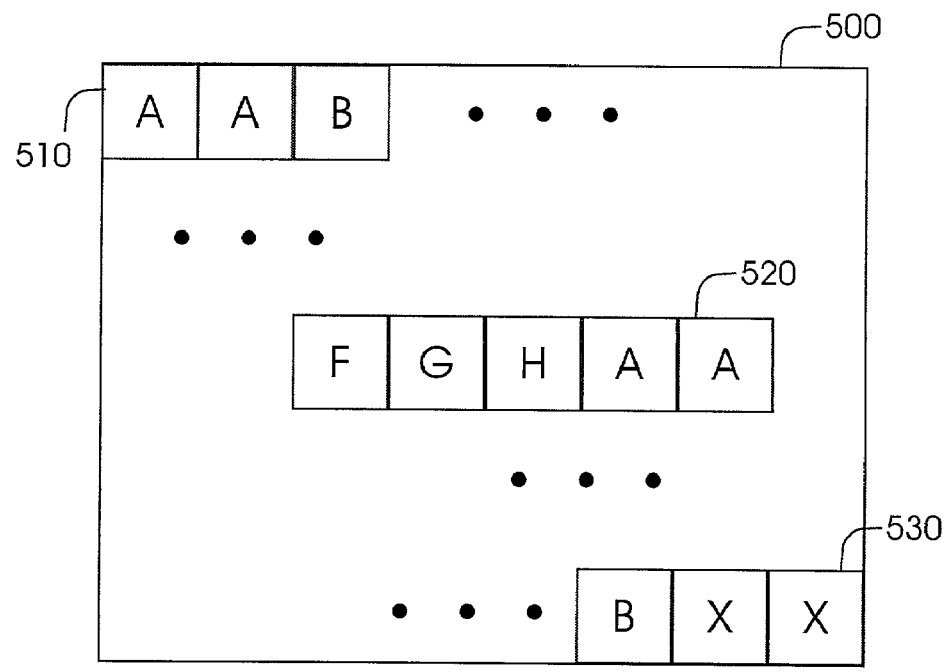
FIG. 5 illustrates data stored on various sectors of the storage device.

FIG. 5 illustrates a portion 500 of the storage device 150 having data (e.g., A, B, F, G, etc.) stored on various sectors thereof (e.g., blocks of sectors 510, 520, 530). The filter driver 130 and/or other suitable program code intercepts calls (e.g., 160, 165) to and from the storage device 150, and thus intercepts communications, such as, the file or file segment identity, the frequency with which each file or file segment is accessed, the location of each attempted accesses, the duration that each file or file segment is accessed, etc. According to the invention, this information may be stored in a suitable database (e.g., information log 200). Exemplary information that may be intercepted for the files and/or file segments shown in FIG. 5 is given in Table 3, below.

TABLE 3

| File | File Location-Sector(s) | Access Duration-Avg Time (sec) | Access Frequency-(No. Per Hour) |
|---|---|---|---|
| A | 1, 2, 450, 451 | 188 | 550 |
| B | 3, 1001 | 15 | 2 |
| ... | ... | ... | ... |
| F | 447 | 78 | 15 |
| G | 448 | 158 | 55 |
| H | 449 | 255 | 351 |
| ... | ... | ... | ... |
| X | 1002, 1003 | 37 | 7 |

The exemplary communications in Table 3 indicates that the data "A" (e.g., a file, file segment, directory, etc.) resides at four different sectors on the storage device 150. In addition, the average duration of each access of the data "A" is relatively significant (i.e., 188 seconds), as is the average access frequency thereof (i.e., 550 times per hour). The data "B" resides at two different sectors on the storage device 150, which are identified by the intercepted communications. In addition, the average duration of each access of the data "B" is relatively insignificant (i.e., 15 seconds), as is the average frequency with which it is accessed (i.e., twice per hour). Therefore, an analysis of this information may indicate that the data "A" may be reallocated, while the data "B" need not necessarily be reallocated at this time, to efficiently defragment the storage device 150.

Figure 6:
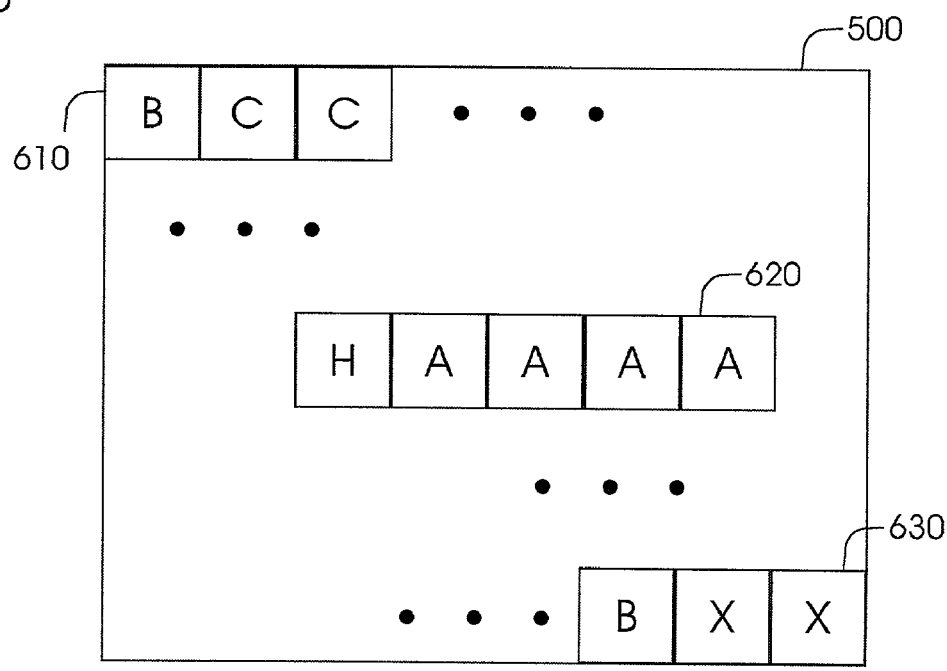
FIG. 6 illustrates data segments stored on various sectors of the storage device after the data has been reallocated or defragmented.

The intercepted communications and analysis thereof may be used by the invention to map the storage device 150, or portions thereof (e.g., portion 500), and to reallocate data thereon for optimal access thereto for the average use. FIG. 6 illustrates data (e.g., A, B, F, G, etc.) stored on various sectors (e.g., blocks of sectors 610, 620, 630) of the portion 500 of the storage device 150 after it has been at least partially defragmented and/or the data has been reallocated thereon. For example, based on the above analysis of the data in Table 3, the data "A" may be reallocated to adjacent or nearby sectors on the storage device 150. In addition, the data "A" may also be reallocated to reside at or near the center of the storage device 150 (e.g., to the block of sectors 620). As such, the access speed of data "A" may be increased and the storage device 150 may be efficiently defragmented.

It is understood that the examples given above with respect to FIG. 5, FIG. 6, and Table 3 are provided to illustrate various embodiments of the invention. In addition, it is understood that the representations of sectors of the storage device 150 shown in FIG. 5 and FIG. 6, and the information in Table 3 are not to be construed as actual representations and/or data, and was not measured or otherwise determined as such.

It is also understood that the examples given above with respect to FIG. 5, FIG. 6, and Table 3 are not intended to limit the scope of the invention thereto. As another example, defragmentation, or partial defragmentation of the storage device 150 may be based on usage patterns. The intercepted communications and analysis thereof may indicate that directly accessed data may be associated with other data on various sectors. For example, when a particular file is opened (e.g., by the user), other associated files are also opened (e.g., by the system). As such, the directly accessed data and the associated data may be reallocated to adjacent or nearby sectors on the storage device 150. As yet another example, the invention may also be used to defragment more than one storage device. Likewise, the data may be reallocated and/or defragmented across more than one such storage device, or among more than one media within a single storage device (e.g., between partitioned drives). Other embodiments are also contemplated as being within the scope of the invention.

Figure 7:
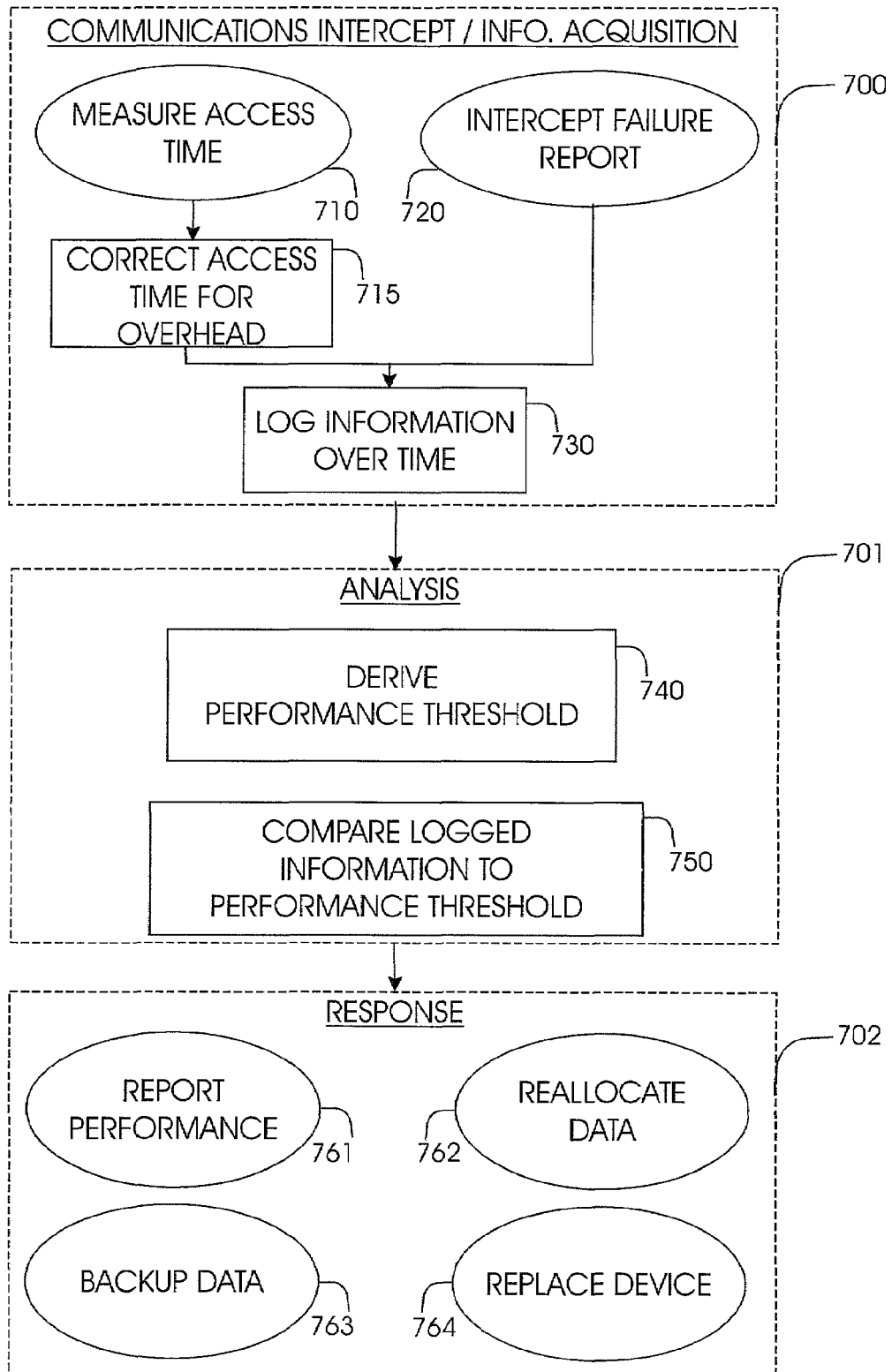
FIG. 7 illustrates embodiments of a method for monitoring the performance of the storage device.

FIG. 7 illustrates embodiments of a method for monitoring the performance of the storage device 150. Generally, the method includes intercepting communications between the computer system 100 and the storage device 150 to acquire information (700), analysis of the intercepted information (701), and response to the analysis of the intercepted information (702). More specifically, acquisition 700 may comprise measuring the access time in step 710, and optionally correcting the access time for overhead in step 715. The access time may also be logged overtime, in step 730 (e.g., in the information log 200). In another embodiment, acquisition 700 may comprise intercepting an error or failure reported by the storage device 150, and optionally logging the error or failure over time, in step 730. Analysis 701 may comprise deriving a performance threshold (e.g., 370, 470) in step 740, and/or comparing the logged information to a performance threshold in step 750. The response 702 may comprise reporting the performance of the storage device 150 in step 761, and/or automatic back-up of the data on the storage device 150 (e.g., prior to failure thereof) in step 763. Alternately, or in addition to, response 702 may comprise reallocating all or some of the data to another portion of the storage device 150 (e.g., to another sector), to another storage device 150, both in step 702, and/or replacing the storage device altogether, in step 764.

Figure 8:
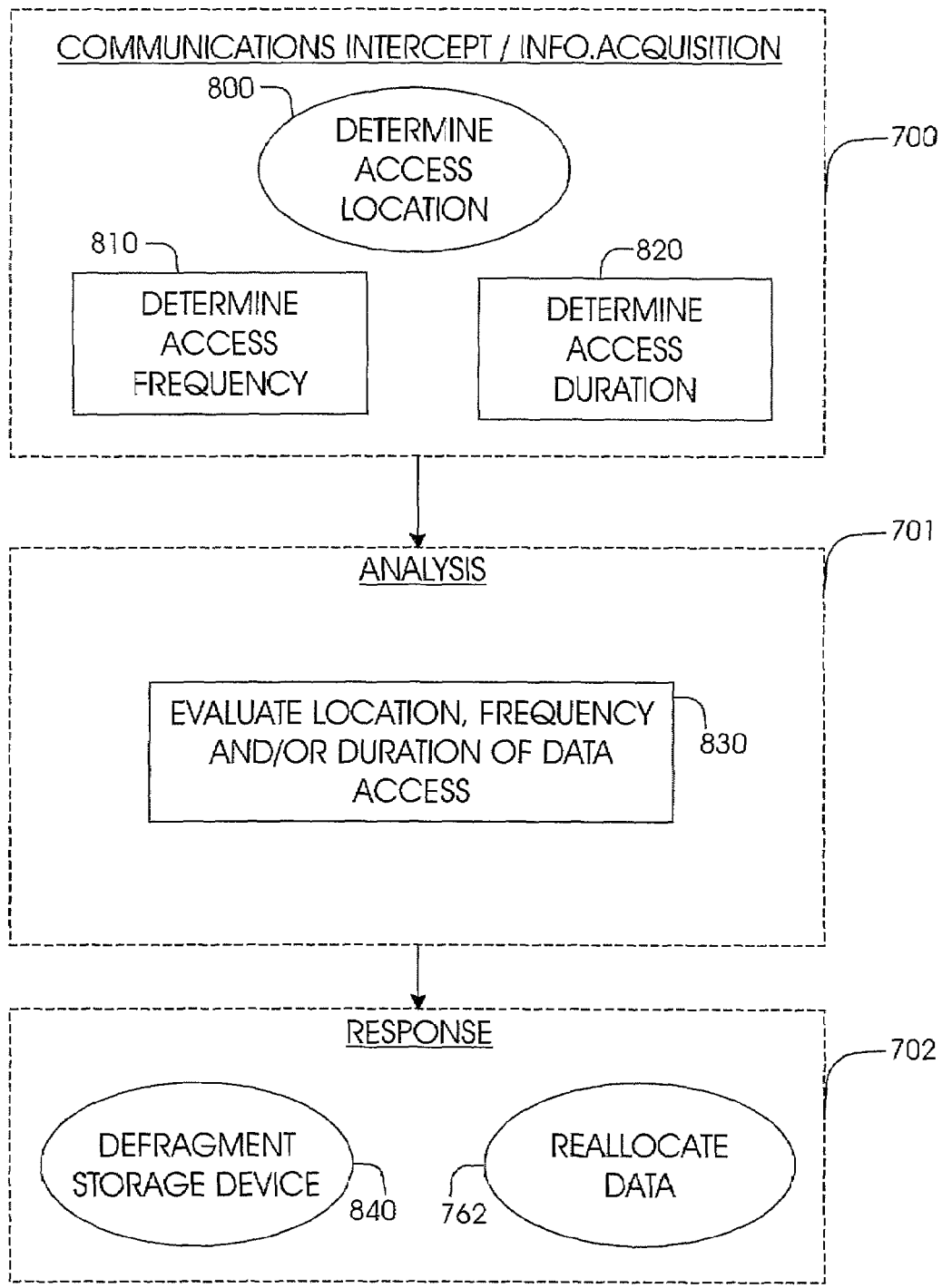
FIG. 8 illustrates further embodiments of a method for monitoring the performance of the storage device.

FIG. 8 illustrates other embodiments of a method for monitoring the performance of the storage device 150. Again, the method generally includes intercepting communications between the computer system 100 and the storage device 150 to acquire information (700), analysis of the intercepted information (701), and response to the analysis of the intercepted information (702). However, in the embodiments shown in FIG. 8, acquisition 700 may comprise determining the access location(s) for data on the storage device 150 in step 800. In step 810, the access frequency of the data may be determined. In addition, or instead of, acquisition 700 may comprise determining the access duration of the data in step 820. Analysis 701 may comprise evaluating the location, frequency, and/or duration of access of the data in step 830. Response 702 may comprise defragmenting the storage device, in step 840. Alternatively, or in addition thereto, data may be reallocated in step 762.

It is understood that the steps shown and described in FIG. 7 and in FIG. 8 are merely illustrative of various exemplary embodiments of the invention and the scope of the invention is not to be limited thereto. The invention may comprise other embodiments having additional or fewer steps than those shown and described above.

The invention has been described above and various embodiments thereof have been illustrated for exemplary purposes. It is understood, however, that other embodiments are also contemplated as being within the scope of the invention. For example, another embodiment may comprise a graphical user interface (GUI) with graphical and/or tabular representations of the intercepted communications and/or analysis thereof. Or for example, in another embodiment, the invention may output a detailed view of the storage device and the performance thereof under various conditions (e.g., under various loads, with respect to certain applications and/or users, etc.). In yet another exemplary embodiment, the invention may output the results of a competitive analysis that may be used to evaluate the performance of existing storage devices 150, storage devices under development, storage devices under consideration for purchase, etc. Yet other embodiments will readily occur to those skilled in the art in view of the teachings of the invention.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for monitoring performance of a storage device, comprising:
    intercepting communications between a computer system and said storage device;
    analyzing said intercepted communications relative to a threshold value for the performance of said storage device; and
    responding to a decline in the performance of said storage device based on said analyzed intercepted communications by automatically reallocating at least some data on said storage device to enhance continued oneration of the storage device.

2. A method as in claim 1, further comprising measuring access time for said storage device.

3. A method as in claim 2, further comprising correcting said measured access time for system overhead.

4. A method as in claim 1, wherein intercepting said communications comprises intercepting an error reported by said storage device.

5. A method as in claim 1, further comprising determining an access location on said storage device and an access frequency for data stored thereon, based on said intercepted communications.

6. A method as in claim 1, further comprising determining an access location on said storage device and an access duration for data stored thereon, based on said intercepted communications.

7. A method as in claim 1, further comprising logging said communications over time.

8. A method as in claim 7, wherein analyzing said communications comprises deriving said threshold value based on said logged communications.

9. A method as in claim 1, wherein responding to said declining performance of said storage device further comprises automatically backing-up data stored on said storage device.

10. A method as in claim 1, wherein reallocating at least some data on said storage device is based on usage patterns of said data.

11. A method as in claim 1, wherein responding to said declining performance of said storage device further comprises defragmenting at least a portion of said storage device.

12. An apparatus for monitoring performance of a storage device, comprising:
    computer readable storage media;
        computer readable program code scored on said computer readable storage media, comprising;
        a) program code for intercepting communications between a computer system and said storage device;
        b) program code for analyzing said communications, wherein said communications are compared to a predicted decline in performance of said storage device; and
        c) program code for responding to a decline in the performance of said storage device by backing up at least some data on said storage device prior to said predicted failure of said storage device to enhance continued operation of said storage device.

13. An apparatus as in claim 12, wherein said program code for intercepting said communications comprises program code for intercepting an error reported by said storage device.

14. An apparatus as in claim 12, further comprising program code for measuring access time for said storage device, and wherein said communications comprises at least said access time.

15. An apparatus as in claim 14, further comprising:
    a) program code for determining system overhead; and
    b) program code for correcting said access time for said system overhead.

16. An apparatus as in claim 12, wherein said program code for responding to said decline in the performance of said storage device further comprises defragmenting at least a portion of said storage device based on said communications.

17. An apparatus as in claim 12, further comprising:
    a communications log;
    program code for logging said communications over time in said communications log; and
    program code for determining the decline in performance of said storage device based at least in part on said logged communications.

18. An apparatus as in claim 12, further comprising program code for deriving a threshold value for the performance of said storage device, wherein said program code for responding to said decline in the performance of said storage device responds when the performance of said storage device satisfies said threshold value thereof.

19. An apparatus as in claim 12, wherein said program code for responding further comprises program code for reallocating data to another sector of said storage device.

20. An apparatus as in claim 19, wherein said program code for reallocating reallocates at least same data on said storage device based on usage patterns of said a least some data.

21. An apparatus as in claim 12, further comprising a graphical user interface for reporting the performance of said storage device to a user.

22. An apparatus for monitoring performance of a storage device, comprising:
- means for evaluating communications between a computer system and said storage device to determine the performance of said storage device based at least in part on intercepted communications with said storage device; and
- means for enhancing the performance of said storage device by reallocating at least some data on the storage device.

23. An apparatus as in claim 22, further comprising means for intercepting communications with said storage device.

24. An apparatus as in claim 22, further comprising means for measuring time to access said storage device, wherein said measured access time is evaluated to determine the performance of said storage device.

25. A method for monitoring performance of a storage device, comprising:
- intercepting communications between a computer system and said storage device;
- analyzing said intercepted communications; and
- reallocating at least some of said data on said storage device to enhance the performance of said storage device based on said analyzed communications.

26. A method as in claim 25, wherein intercepting said communications comprises determining access location, access frequency, and access duration for said data on said storage device.

* * * * *

UNITED STATES PATENT AND TRADEMARK OFFICE
CERTIFICATE OF CORRECTION

| | |
|---|---|
| PATENT NO. | : 7,120,832 B2 |
| APPLICATION NO. | : 09/966953 |
| DATED | : October 10, 2006 |
| INVENTOR(S) | : Kevin Collins et al. |

It is certified that error appears in the above-identified patent and that said Letters Patent is hereby corrected as shown below:

In column 8, line 1, delete "sifting" and insert -- sitting --, therefor.

In column 11, line 45, in Claim 1, delete "oneration" and insert -- operation --, therefor.

In column 12, line 16, in Claim 12, delete "scored" and insert -- stored --, therefor.

In column 12, line 17, in Claim 12, delete "comprising;" and insert -- comprising: --, therefor.

In column 12, line 65, in Claim 20, delete "same" and insert -- some --, therefor.

In column 12, line 66, in Claim 20, delete "a" and insert -- at --, therefor.

Signed and Sealed this
Tenth Day of July, 2012

David J. Kappos
*Director of the United States Patent and Trademark Office*